United States Patent [19]

Sweeny et al.

[11] 3,871,906

[45] Mar. 18, 1975

[54] PROCESS FOR MAKING PARTICULATE SELF-DESTRUCTING PESTICIDAL COMPOSITIONS

[75] Inventors: Keith H. Sweeny, West Covina; James R. Fischer, Claremont; Charles A. Lung, Buena Park; Elmer M. Wilson, Pasadena, all of Calif.

[73] Assignee: The United States of America as represented by the Secretary of the Interior, Washington, D.C.

[22] Filed: Oct. 11, 1973

[21] Appl. No.: 405,709

Related U.S. Application Data

[62] Division of Ser. No. 100,985, Dec. 23, 1970, Pat. No. 3,767,783.

[52] U.S. Cl. ............... 117/75, 71/DIG. 1, 117/29, 117/33, 117/92, 117/100 M, 117/127
[51] Int. Cl. ............................................. B44d 1/14
[58] Field of Search ........... 117/100 M, 33, 75, 127, 117/92, 29; 424/16, 132, 140, 145, 147, 2, 10; 71/DIG. 1

[56] References Cited
UNITED STATES PATENTS

| | | | |
|---|---|---|---|
| 1,911,868 | 5/1933 | Young | 424/162 |
| 2,069,710 | 2/1937 | Missbach | 424/162 |
| 2,165,206 | 7/1939 | Bacon et al. | 424/162 |
| 2,414,193 | 1/1947 | Durham | 424/354 |
| 3,295,950 | 1/1967 | Blouen et al. | 117/100 A |
| 3,672,945 | 6/1972 | Taylor | 117/100 B |

FOREIGN PATENTS OR APPLICATIONS

| | | | |
|---|---|---|---|
| 589,926 | 12/1959 | Canada | 71/DIG. 1 |

OTHER PUBLICATIONS

Fleck et al., Industrial and Engrg. Chem. 37(4) pp. 403–405, April 1945 "Compatability of DDT with Insec. Fungicide–Fertilizers."

Fleck et al., J.A.C.S. 66:2095 Dec. 1944 "Catalytic Removal of Hydrogen Chloride from Some $\alpha$-Trichloroethanes."

Chem. Abstract, Vol. 40, item $6199^2$ Gunther et al., 1946 "Inhibition of the Catalyzed Thermal Decomposition of DDT."

Primary Examiner—William D. Martin
Assistant Examiner—Dennis C. Konopacki
Attorney, Agent, or Firm—Roland H. Shubert; Gersten Sadowsky

[57] ABSTRACT

Particulate pesticidal compositions having self-destructing properties are prepared by coating a particulate metal core with a solid acid or a metal salt which hydrolyzes to produce an acidic environment. The acid layer is then coated with a second layer of an isolating material, such as poly vinyl alcohol, which degrades after exposure to field conditions. A normally persistant pesticide, such as DDT, is adhesively coated on the exterior of the isolating layer. Upon exposure to field conditions, the isolating layer degrades allowing moisture to react with the solid acid or hydrolyzable salt thus allowing the metal core, which may be metallic zinc or a metallic couple such as zinc-copper, to react with the pesticide to produce degradation products having greatly reduced physiological activity than that displayed by the pesticide.

7 Claims, 2 Drawing Figures

3,871,906

PROCESS FOR MAKING PARTICULATE SELF-DESTRUCTING PESTICIDAL COMPOSITIONS

This is a division, of application Ser. No. 100,985, filed Dec. 23, 1970 now U.S. Pat. No. 3,767,783.

BACKGROUND OF THE INVENTION

A number of extremely useful pesticides also possess great stability and show little degradation when exposed to ordinary environmental conditions. Hence, they persist in soil and water for long periods of time; often for many years. Repeated use of such pesticides may even result in a continuing build-up of residual pesticide concentration in the environment.

Such enviromental stability is a very desirable characteristic for some uses as in long term termite protection of buildings and other structures. That same characteristic is undesirable when the pesticide is used for the short term control or eradication of a particular organism. Typical of such useful but presistent pesticides are the halogenated organics exemplified by DDT, chlordane, toxaphene, dieldrin and the like.

It is now recognized that at least some of these pesticides are retained within the body of many organisms and higher animals resulting in progressively higher concentrations of pesticide as one progresses up the food chain. It has also been recognized that relatively high concentrations of pesticide will affect metabolic processes, particularly reproductive functioning, of some animals. For example, DDT has been linked to the so-called soft shell syndrome observed in a variety of birds.

In spite of their ecological hazards, no really satisfactory substitute is available for many of the halogenated hydrocarbons in a number of specific uses. Many of the undesirable side effects of halogenated organic pesticides would be alleviated if they were less stable and degraded to form innocuous products after a relatively short exposure to environmental conditions.

SUMMARY OF THE INVENTION

We have found that stable pesticide compounds, such as halogenated organics, may be formulated to obtain their complete or nearly complete destruction within a predetermined time after field application. The formulation includes an integrated, self-destructing pesticide particle comprising the pesticide, a material which reacts with the pesticide, and a means to delay the reaction for a predetermined length of time.

A specific embodiment of our invention comprises a formulation of a halogenated organic pesticide such as DDT with a reductant such as a zinc-copper couple in combination with a material which supplies a localized acidic environment. The pesticide is segregated from the reductant by a coating material which disintegrates within a predetermined period of time after field application thus giving a reaction delay.

OBJECTS OF THE INVENTION

It is an object of our invention to provide a particulate, self-destructing pesticide formulation.

Another object of our invention is to provide a method for the application of normally persistent pesticides to a field environment while avoiding residual accumulations of those materials.

Yet another object of our invention is to provide a process for the formulation of self-destructing pesticide particles.

DETAILED DESCRIPTION OF THE INVENTION

The invention will be more clearly understood by reference to the accompanying drawings in which.

Figure 1:
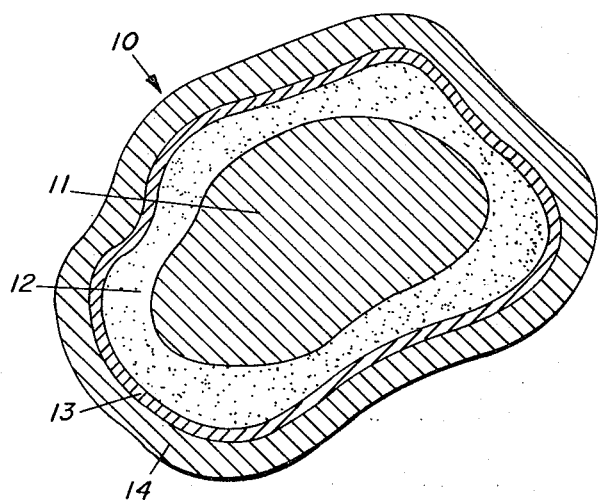
FIG. 1 represents a generalized cross-sectional view of a self-destructing pesticide particle.

Referring now to FIG. 1, an individual formulated pesticide particle is generally represented by the numeral 10. The particle comprises a central core 11 of a reactant material which is preferably a metal or a metallic couple capable of either reducing or polymerizing the pesticide to biologically inactive forms. Coated on the core, preferably as a continuous layer, is solid, acid-producing material 12. Layer 13 comprises a relatively thin, continuous coating which serves to temporarily isolate the reactive inner portion of the particle from the environment. Preferably layer 13 comprises a film-forming material which decomposes or dissolves within a relatively short but predictable period after being exposed to a typical outdoor environment. Finally, exterior layer 14 comprises a pesticidal composition adhering to coating 13.

Size of the composite particles is preferably within the range of conventional pesticidal powders adapted for application by air dispersion. Diameter of the individual composite particles should be within the general range of about 1 to about 100 microns. The optimal and preferred particle size to achieve highly efficient pest control action and uniformity of application ranges from about 5 to about 20 microns.

In co-pending commonly assigned patent applications Ser. Nos. 100,975 and 101,201, now U.S. Pat. Nos. 3,737,384 and 3,640,821, respectively, there is disclosed the reaction of DDT and other chlorinated organic pesticides with metallic zinc and a variety of metallic couples in an acid environment to produce relatively innocuous degradation products. Any of the metal reductants disclosed in those applications may be used as the reactive central core material 11. These metal reductants include metallic zinc and metallic couples comprising a minor amount of a catalytic metal, such as copper or silver, combined with a major amount of a reductant metal such as zinc, aluminum, iron, cadmium and magnesium. Examples of metallic couples useful in our invention include zinc-copper, zinc-silver, aluminum-copper, iron-copper, magnesium-copper and cadmium-copper. Of these metallic reductants, the following are preferred: metallic zinc, zinc-copper, aluminum-copper and iron-copper.

It is preferred that the metallic reductant be present in stoichiometric excess relative to the pesticide. In the degradative reaction of metallic zinc or zinc couple with p,p'-DDT, for example, the reaction proceeds via chlorine removal to form relatively non-toxic products. The major end product of this reaction is 1,1 bis(p-chlorophenyl)ethane which theoretically requires 3 equivalents of reductant per mol of DDT. On a weight basis, 0.28 lb of zinc is required to reduct 1 lb of DDT. However, it is preferred that zinc be present in about 2 to 10 times the stoichiometric requirements. An equal weight of zinc and DDT, representing a stoichiometric excess of a factor of about 4, has given good results.

When using aluminum-copper or iron-copper couples, there occurs a different type of reaction with DDT. In these cases, the DDT is essentially dimerized to form a compound which has been identified as 1,1,4,4-tetra(p-chlorophenyl)-2,2,3,3-tetrachlorobutane. This compound is lipoid insoluble and appears to exhibit little if any physiological activity. Only one equivalent of reductant is required per mol of DDT in the reaction. Hence, only 0.025 lb of aluminum or 0.052 lb of iron is theoretically required per lb of DDT. Again, it is preferred that the metal be present in about 2 to 10 times that amount theoretically required.

The metallic couples may be prepared in a variety of simple ways. For example, preparation of a metal-copper couple may be carried out by contacting a metal powder with a dilute solution of a copper salt such as the sulfate or chloride. A thin film of metallic copper is thus deposited over the surface of the metal particles. Generally, about 0.1 to about 10 milliequivalents of copper are used per gram of metal powder. Optimum results were achieved at a copper level of about 1 meq per g of metal particles. Other methods of preparation, such as by the hot reduction of a mixture of metal and cupric oxide to yield a metal alloy, gave substantially equivalent results.

Acid producing material 12 may comprise any of a large variety of solid acids or hydrolyzable salts. Any such compound which can produce a localized acidic environment having a pH below about 4, and preferably on the order of pH 2, may find use in our pesticidal composition provided further that it can be deposited as a layered coating around a metal particle. Examples of solid acids which may be used include a number of the lower, solid monocarboxylic acids, dicarboxylic acids such as oxalic and malonic; tricarboxylic acids such as citric; halogen substituted organic acids such as chloroacetic and such miscellaneous acids as sulfamic. Metal salts, particularly those of aluminum and ferric iron, which hydrolyze to form an acidic environment, may also be used. In a preferred embodiment, there is incorporated with the acid producing material an emulsifying agent for the pesticide. Examples of emulsifying agents which may be used include surfactants such as those based on alkyl-aryl polyether alcohols, sulfonates and sulfates.

The amount or proportion of acid producing material incorporated within each particle is not critical. It is necessary that material 12 maintain a localized acidic environment for a period of time of at least about an hour and preferably for a time period of several hours to several days after disintegration of the particle is initiated.

Coating layer 13 serves to temporarily isolate the pesticide from the reactive central particle core. It is composed of a material which degrades, decomposes or dissolves upon exposure to an ordinary field environment for a predetermined length of time. Coating 13 may comprise a material which slowly dissolves upon exposure to a damp or wet environment or which decomposes upon exposure to ultraviolet radiation or even to oxygen. Examples of appropriate coating materials include trimethyl silyl compounds, microcrystalline waxes, modified polyvinyl alcohols, polyesters, polyethylene and a variety of condensation polymers.

Coating layer 13 may be applied using a number of conventional techniques. For example, the coating material may be dissolved in a suitable solvent and slurried with the particle. After driving off the solvent, usually by heating, the individual particles retain a thin layer of the coating material. Depending upon the coating material, other techniques may be used including vapor deposition, fluidized bed coating processes and precipitation of coating materials from solution.

Exterior layer 14 comprises a pesticide preferably applied in an adhering but discontinuous fashion to coating layer 13. The pesticide may comprise any one or a mixture of halogenated organic compounds. These compounds include DDT, toxaphene, lindane, methoxychlor, dieldrin, Kelthane, chlordane, Perthane, endrin, aldrin, heptachlor and the like. Kelthane is a trademark for an agricultural miticide based on 1,1-bis(para-chlorophenyl)-2,2,2-trichloroethanol while Perthane is a trademark for an agricultural insecticide based on 1,1-dichloro-2,2-bis(para-ethylphenyl)ethane. Since the bulk of the pesticide is exposed to the environment in this arrangement, there is little if any reduction in pesticidal activity compared with normal formulations.

Field life of the pesticidal composition may be varied in several ways. First, by proper selection of the material making up isolating coating layer 13, it is possible to adjust average field life over a wide time range. Secondly, by varying the thickness of layer 13, average field life may be varied over a somewhat shorter time span.

Figure 2:
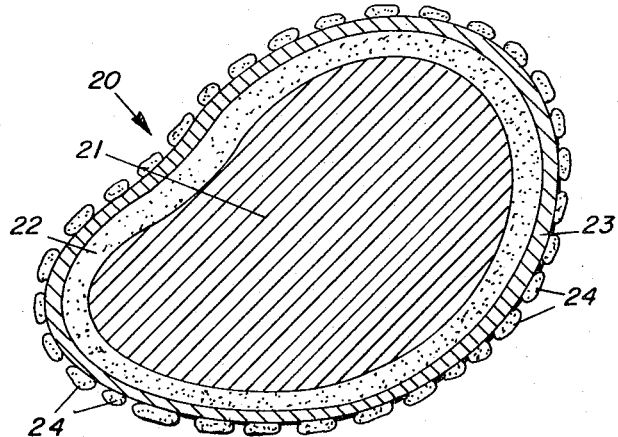
FIG. 2 is a cross-sectional representation of another embodiment of our pesticide formulation.

FIG. 2 illustrates another embodiment of our pesticidal formulation. Numeral 20 generally represents a cross-sectional view of a single composite particle having a reactive central core 21, an acid-producing layer 22 and an environmental isolation layer 23. Dispersed upon and adhering to layer 23 are a plurality of pesticide particles 24 exposed and available for pest control action. Composition of each of the layers making up composite particle 20 is similar to the corresponding layer of particle 10.

Tests with a Greenfield Sandy Loam soil, considered to be representative of many California agricultural regions, were used to evaluate other techniques for the controlled decomposition of DDT. In one series of tests, DDT was sprayed as an emulsifiable concentrate onto soil flats at the rate of 1 lb DDT per acre. Particles of zinc-copper couple having a nominal particle size of about 5 microns were then sprayed onto the same soil flats followed by a dilute acetic acid spray. The samples were exposed to an out-of-doors environment for 4 days and were then extracted and analyzed. It was found that about 40 to 45 percent of the DDT had decomposed during this time but that only a trace of the preferred degradation product DDEt (1,1bis(p-chlorophenyl)-1-lchoroethane) had been formed. On the other hand, when a composite particle formulation comprising DDT and the zinc-copper couple, were applied to the soil under the same or similar conditions, about 90 percent of the DDT decomposed within 4 days giving DDEt as the major decomposition product.

What is claimed is:

1. A process for making a composite, particulate, self-destructing pesticidal composition which comprises:

depositing a layer of solid, acid-producing material upon a central particulate core, said core comprising a metallic reductant, said metallic reductant being capable of reacting with chlorinated organic pesticides in an acidic environment to produce relatively innocuous degradation products;

forming a second layer around said acid producing material; said second layer comprising a material which serves to temporarily isolate said metallic core and said acid producing material from an external environment and which degrades after exposure to moisture, ultraviolet radiation or oxygen of a field environment for a predetermined length of time, and adhesively depositing a pesticide selected from the group consisting of DDT, toxaphene, lindane, methoxychlor, dieldrin, kelthane, chlordane, Perthane, endrin, aldrin, and heptachlor upon the exterior surface of said second layer.

2. The process of claim 1 wherein the metallic central core has a diameter greater than about 5 microns and the composite particle has a diameter less than about 20 microns.

3. The process of claim 2 wherein the metallic reductant making up the central core is selected from the group consisting of metallic zinc and the metallic couples of zinc-copper, zinc-silver, aluminun-copper, iron-copper, magnesium-copper and cadmium-copper.

4. The process of claim 3 wherein the acid-producing material is selected from the group consisting of solid acids and the hydrolyzable inorganic salts of aluminum or ferric iron and is capable of producing a localized acidic environment having a pH below about 4 upon contact with moisture normally present in a field environment.

5. The process of claim 4 wherein the pesticide is DDT and wherein the central core is selected from the group consisting of the bimetallic couples of zinc-copper, aluminum-copper and iron-copper.

6. The process of claim 5 wherein the bimetallic couple making up the central core is present in 2 to 10 fold excess over that stoichiometrically required to completely react with the DDT.

7. The process of claim 6 wherein the second layer is selected from the group consisting of trimethyl silyl compounds, microcrystalline waxes and polyvinyl alcohols.

* * * * *